United States Patent
Martin et al.

(10) Patent No.: US 9,262,534 B2
(45) Date of Patent: Feb. 16, 2016

(54) RECOMMENDER SYSTEM FOR IDENTIFYING A NEW SET OF MEDIA ITEMS RESPONSIVE TO AN INPUT SET OF MEDIA ITEMS AND KNOWLEDGE BASE METRICS

(71) Applicant: Apple Inc., Cupertino, CA (US)

(72) Inventors: Francisco J. Martin, Corvallis, OR (US); Jim Shur, Corvallis, OR (US); Marc Torrens, Corvallis, OR (US)

(73) Assignee: Apple Inc., Cupertino, CA (US)

( * ) Notice: Subject to any disclaimer, the term of this patent is extended or adjusted under 35 U.S.C. 154(b) by 223 days.

(21) Appl. No.: 13/674,820

(22) Filed: Nov. 12, 2012

(65) Prior Publication Data

US 2013/0080455 A1     Mar. 28, 2013

Related U.S. Application Data

(63) Continuation of application No. 12/685,639, filed on Jan. 11, 2010, now Pat. No. 8,312,017, which is a continuation of application No. 11/346,818, filed on Feb. 3, 2006, now Pat. No. 7,734,569.

(60) Provisional application No. 60/649,987, filed on Feb. 3, 2005.

(51) Int. Cl.
*G06F 17/30*     (2006.01)
*G06Q 30/02*     (2012.01)
(Continued)

(52) U.S. Cl.
CPC .......... *G06F 17/30867* (2013.01); *G06Q 30/02* (2013.01); *G06Q 30/0631* (2013.01);
(Continued)

(58) Field of Classification Search
CPC ................. G06F 17/30867; G06F 17/30038; G06F 17/30058; G06F 17/30994
USPC .......... 707/722, 736, 737, 754, 780, 916, 948
See application file for complete search history.

(56) References Cited

U.S. PATENT DOCUMENTS 4,996,642 A    2/1991   Hey
5,355,302 A   10/1994   Martin
(Continued)

FOREIGN PATENT DOCUMENTS

EP             1050833         8/2000
EP             1231788         8/2002
(Continued)

OTHER PUBLICATIONS

Canada—Examiner's Report for App. No. 2713507 mailed on Sep. 21, 2011.
(Continued)

*Primary Examiner* — Shahid Alam
(74) *Attorney, Agent, or Firm* — Novak Druce Connolly Bove + Quigg LLP

(57) ABSTRACT

Systems and methods are disclosed for identifying a new set of media items in response to an input set (or "query set") of media items and knowledge base metrics. The system uses a knowledge base consisting of a collection of mediasets. Various metrics among media items are considered by analyzing how the media items are grouped to form the mediasets in the knowledge base. Such association or "similarity" metrics are preferably stored in a matrix form that allows the system to efficiently identify a new set of media items that complements the input set of media items.

30 Claims, 4 Drawing Sheets

(51) Int. Cl.
*H04N 7/16* (2011.01)
*H04N 21/466* (2011.01)
*H04N 21/482* (2011.01)
*G06Q 30/06* (2012.01)

(52) U.S. Cl.
CPC ............. *H04N7/163* (2013.01); *H04N 21/466* (2013.01); *H04N 21/4668* (2013.01); *H04N 21/4825* (2013.01); Y10S 707/99935 (2013.01)

(56) References Cited

U.S. PATENT DOCUMENTS

| | | |
|---|---|---|
| 5,375,235 A | 12/1994 | Berry et al. |
| 5,464,946 A | 11/1995 | Lewis |
| 5,483,278 A | 1/1996 | Strubbe |
| 5,583,763 A | 12/1996 | Atcheson et al. |
| 5,724,521 A | 3/1998 | Dedrick |
| 5,749,081 A | 5/1998 | Whiteis |
| 5,754,939 A | 5/1998 | Herz |
| 5,758,257 A | 5/1998 | Herz |
| 5,765,144 A | 6/1998 | Larche |
| 5,890,152 A | 3/1999 | Rapaport |
| 5,918,014 A | 6/1999 | Robinson |
| 5,926,624 A | 7/1999 | Katz et al. |
| 5,950,176 A | 9/1999 | Keiser |
| 6,000,044 A | 12/1999 | Chrysos et al. |
| 6,041,311 A | 3/2000 | Chislenko et al. |
| 6,047,311 A | 4/2000 | Ueno et al. |
| 6,112,186 A | 8/2000 | Bergh et al. |
| 6,134,532 A | 10/2000 | Lazarus et al. |
| 6,345,288 B1 | 2/2002 | Reed |
| 6,346,951 B1 | 2/2002 | Mastronardi |
| 6,347,313 B1 | 2/2002 | Ma |
| 6,349,339 B1 | 2/2002 | Williams |
| 6,381,575 B1 | 4/2002 | Martin et al. |
| 6,430,539 B1 | 8/2002 | Lazarus et al. |
| 6,434,621 B1 | 8/2002 | Pezzillo |
| 6,438,579 B1 | 8/2002 | Hosken |
| 6,457,018 B1 | 9/2002 | Rubin |
| 6,487,539 B1 | 11/2002 | Aggarwal et al. |
| 6,526,411 B1 | 2/2003 | Ward |
| 6,532,469 B1 | 3/2003 | Feldman et al. |
| 6,577,716 B1 | 6/2003 | Minter |
| 6,587,127 B1 | 7/2003 | Leeke et al. |
| 6,615,208 B1 | 9/2003 | Behrens et al. |
| 6,647,371 B2 | 11/2003 | Shinohara |
| 6,687,696 B2 | 2/2004 | Hofmann et al. |
| 6,690,918 B2 | 2/2004 | Evans et al. |
| 6,704,576 B1 | 3/2004 | Brachman et al. |
| 6,727,914 B1 | 4/2004 | Gutta |
| 6,748,395 B1 | 6/2004 | Picker et al. |
| 6,751,574 B2 | 6/2004 | Shinohara |
| 6,785,688 B2 | 8/2004 | Abajian et al. |
| 6,842,748 B1 | 1/2005 | Warner et al. |
| 6,842,761 B2 | 1/2005 | Diamond et al. |
| 6,850,252 B1 | 2/2005 | Hoffberg |
| 6,914,891 B2 | 7/2005 | Ha et al. |
| 6,931,454 B2 | 8/2005 | Deshpande et al. |
| 6,933,433 B1 | 8/2005 | Porteus |
| 6,941,324 B2 | 9/2005 | Plastina |
| 6,947,922 B1 | 9/2005 | Glance |
| 6,950,804 B2 | 9/2005 | Strietzel |
| 6,987,221 B2 | 1/2006 | Platt |
| 6,990,497 B2 | 1/2006 | O'Rourke et al. |
| 6,993,532 B1 | 1/2006 | Platt et al. |
| 7,013,238 B1 | 3/2006 | Weare |
| 7,020,637 B2 | 3/2006 | Bratton |
| 7,021,836 B2 | 4/2006 | Anderson et al. |
| 7,043,479 B2 | 5/2006 | Ireton |
| 7,051,352 B1 | 5/2006 | Schaffer |
| 7,072,846 B1 | 7/2006 | Robinson |
| 7,082,407 B1 | 7/2006 | Bezos et al. |
| 7,096,234 B2 | 8/2006 | Plastina |
| 7,111,240 B2 | 9/2006 | Crow |
| 7,113,917 B2 | 9/2006 | Jacobi |
| 7,113,999 B2 | 9/2006 | Pestoni et al. |
| 7,120,619 B2 | 10/2006 | Drucker et al. |
| 7,127,143 B2 | 10/2006 | Elkins, II et al. |
| 7,136,866 B2 | 11/2006 | Springer, Jr. |
| 7,139,723 B2 | 11/2006 | Conkwright |
| 7,174,126 B2 | 2/2007 | McElhatten |
| 7,180,473 B2 | 2/2007 | Horie |
| 7,194,421 B2 | 3/2007 | Conkwright |
| 7,196,258 B2 | 3/2007 | Platt |
| 7,197,472 B2 | 3/2007 | Conkwright |
| 7,224,282 B2 | 5/2007 | Terauchi et al. |
| 7,227,072 B1 | 6/2007 | Weare |
| 7,236,941 B2 | 6/2007 | Conkwright |
| 7,246,041 B2 | 7/2007 | Fukuda |
| 7,256,341 B2 | 8/2007 | Plastina |
| 7,277,870 B2 | 10/2007 | Mourad et al. |
| 7,302,419 B2 | 11/2007 | Conkwright |
| 7,302,468 B2 | 11/2007 | Wijeratne |
| 7,358,434 B2 | 4/2008 | Plastina |
| 7,363,314 B2 | 4/2008 | Picker et al. |
| 7,392,212 B2 | 6/2008 | Hancock |
| 7,403,769 B2 | 7/2008 | Kopra |
| 7,415,181 B2 | 8/2008 | Greenwood |
| 7,434,247 B2 | 10/2008 | Dudkiewicz et al. |
| 7,457,852 B2 | 11/2008 | O'Rourke et al. |
| 7,457,862 B2 | 11/2008 | Hepworth et al. |
| 7,478,323 B2 | 1/2009 | Dowdy |
| 7,487,107 B2 | 2/2009 | Blanchard et al. |
| 7,490,775 B2 | 2/2009 | Biderman |
| 7,493,572 B2 | 2/2009 | Card et al. |
| 7,499,630 B2 | 3/2009 | Koch et al. |
| 7,505,959 B2 | 3/2009 | Kaiser et al. |
| 7,546,254 B2 | 6/2009 | Bednarek |
| 7,568,213 B2 | 7/2009 | Carhart et al. |
| 7,571,121 B2 | 8/2009 | Bezos |
| 7,571,183 B2 | 8/2009 | Renshaw et al. |
| 7,574,422 B2 | 8/2009 | Guan et al. |
| 7,574,513 B2 | 8/2009 | Dunning et al. |
| 7,580,932 B2 | 8/2009 | Plastina et al. |
| 7,599,847 B2 | 10/2009 | Block et al. |
| 7,599,906 B2 | 10/2009 | Kashiwagi |
| 7,599,950 B2 | 10/2009 | Walther et al. |
| 7,644,077 B2 | 1/2010 | Picker et al. |
| 7,647,613 B2 | 1/2010 | Drakoulis |
| 7,650,570 B2 | 1/2010 | Torrens et al. |
| 7,657,224 B2 | 2/2010 | Goldberg et al. |
| 7,657,493 B2 | 2/2010 | Meijer |
| 7,680,849 B2 | 3/2010 | Heller |
| 7,680,959 B2 | 3/2010 | Svendsen |
| 7,685,204 B2 | 3/2010 | Rogers |
| 7,693,887 B2 | 4/2010 | McLaughlin |
| 7,707,603 B2 | 4/2010 | Abanami |
| 7,720,871 B2 | 5/2010 | Rogers et al. |
| 7,725,494 B2 | 5/2010 | Rogers et al. |
| 7,734,569 B2 | 6/2010 | Martin |
| 7,743,009 B2 | 6/2010 | Hangartner |
| 7,797,321 B2 | 9/2010 | Martin |
| 7,797,446 B2 | 9/2010 | Heller et al. |
| 7,826,444 B2 | 11/2010 | Irvin |
| 7,831,199 B2 | 11/2010 | Ng |
| 7,840,570 B2 | 11/2010 | Cervera et al. |
| 7,853,712 B2 | 12/2010 | Amidon et al. |
| 7,875,788 B2 | 1/2011 | Benyamin |
| 7,889,724 B2 | 2/2011 | Irvin |
| 8,260,656 B1 | 9/2012 | Harbick et al. |
| 2001/0007099 A1 | 7/2001 | Rau |
| 2001/0021914 A1 | 9/2001 | Jacobi et al. |
| 2001/0056434 A1 | 12/2001 | Kaplan et al. |
| 2002/0002899 A1 | 1/2002 | Gjerdingen |
| 2002/0042912 A1 | 4/2002 | Iijima et al. |
| 2002/0059094 A1 | 5/2002 | Hosea et al. |
| 2002/0082901 A1 | 6/2002 | Dunning et al. |
| 2002/0087970 A1 | 7/2002 | Dorricott et al. |
| 2002/0152117 A1 | 10/2002 | Cristofalo et al. |
| 2002/0164973 A1 | 11/2002 | Janik et al. |
| 2002/0178223 A1 | 11/2002 | Bushkin |
| 2002/0178276 A1 | 11/2002 | McCartney et al. |
| 2002/0194215 A1 | 12/2002 | Cantrell et al. |
| 2002/0194309 A1 | 12/2002 | Carter et al. |

(56) References Cited

U.S. PATENT DOCUMENTS

| | | |
|---|---|---|
| 2003/0022953 A1 | 1/2003 | Zampini et al. |
| 2003/0033321 A1 | 2/2003 | Schrempp et al. |
| 2003/0055689 A1 | 3/2003 | Block |
| 2003/0089218 A1 | 5/2003 | Gang et al. |
| 2003/0097379 A1 | 5/2003 | Ireton |
| 2003/0120630 A1 | 6/2003 | Tunkelang |
| 2003/0182254 A1 | 9/2003 | Plastina et al. |
| 2003/0212710 A1 | 11/2003 | Guy |
| 2003/0221541 A1 | 12/2003 | Platt |
| 2003/0229537 A1 | 12/2003 | Dunning et al. |
| 2004/0002993 A1 | 1/2004 | Toussaint et al. |
| 2004/0003392 A1 | 1/2004 | Trajkovic et al. |
| 2004/0068552 A1 | 4/2004 | Kotz et al. |
| 2004/0070538 A1 | 4/2004 | Horie et al. |
| 2004/0073924 A1 | 4/2004 | Pendakur |
| 2004/0078383 A1 | 4/2004 | Mercer et al. |
| 2004/0128286 A1 | 7/2004 | Yasushi et al. |
| 2004/0139064 A1 | 7/2004 | Chevallier et al. |
| 2004/0148424 A1 | 7/2004 | Berkson et al. |
| 2004/0158860 A1 | 8/2004 | Crow |
| 2004/0162738 A1 | 8/2004 | Sanders et al. |
| 2004/0186780 A1 | 9/2004 | Short et al. |
| 2004/0194128 A1 | 9/2004 | McIntyre |
| 2004/0215657 A1 | 10/2004 | Drucker et al. |
| 2004/0263337 A1 | 12/2004 | Terauchi et al. |
| 2004/0267715 A1 | 12/2004 | Polson et al. |
| 2005/0005246 A1 | 1/2005 | Card et al. |
| 2005/0021470 A1 | 1/2005 | Martin et al. |
| 2005/0050079 A1 | 3/2005 | Plastina et al. |
| 2005/0060350 A1 | 3/2005 | Baum et al. |
| 2005/0075908 A1 | 4/2005 | Stevens |
| 2005/0091146 A1 | 4/2005 | Levinson |
| 2005/0102610 A1 | 5/2005 | Jie |
| 2005/0114357 A1 | 5/2005 | Chengalvarayan et al. |
| 2005/0131752 A1 | 6/2005 | Gracie |
| 2005/0141709 A1 | 6/2005 | Bratton |
| 2005/0154608 A1 | 7/2005 | Paulson et al. |
| 2005/0160458 A1 | 7/2005 | Baumgartner |
| 2005/0193014 A1 | 9/2005 | Prince |
| 2005/0193054 A1 | 9/2005 | Wilson et al. |
| 2005/0195696 A1 | 9/2005 | Rekimoto |
| 2005/0198075 A1 | 9/2005 | Plastina et al. |
| 2005/0203807 A1 | 9/2005 | Bezos et al. |
| 2005/0210009 A1 | 9/2005 | Tran |
| 2005/0210101 A1 | 9/2005 | Janik |
| 2005/0216855 A1 | 9/2005 | Kopra et al. |
| 2005/0216859 A1 | 9/2005 | Paek et al. |
| 2005/0222989 A1 | 10/2005 | Haveliwala et al. |
| 2005/0223039 A1 | 10/2005 | Kim et al. |
| 2005/0234891 A1 | 10/2005 | Walther et al. |
| 2005/0235811 A1 | 10/2005 | Dukane |
| 2005/0251440 A1 | 11/2005 | Bednarek |
| 2005/0256867 A1 | 11/2005 | Walther et al. |
| 2005/0276570 A1 | 12/2005 | Reed et al. |
| 2006/0015571 A1 | 1/2006 | Fukuda et al. |
| 2006/0015904 A1 | 1/2006 | Marcus |
| 2006/0018208 A1 | 1/2006 | Nathan et al. |
| 2006/0018209 A1 | 1/2006 | Drakoulis et al. |
| 2006/0020062 A1 | 1/2006 | Bloom |
| 2006/0020662 A1 | 1/2006 | Robinson |
| 2006/0026263 A1 | 2/2006 | Raghavan et al. |
| 2006/0031288 A1 | 2/2006 | Ter Horst et al. |
| 2006/0032363 A1 | 2/2006 | Platt |
| 2006/0053077 A1 | 3/2006 | Mourad |
| 2006/0062094 A1 | 3/2006 | Nathan et al. |
| 2006/0067296 A1 | 3/2006 | Bershad |
| 2006/0074750 A1 | 4/2006 | Clark et al. |
| 2006/0080251 A1 | 4/2006 | Fried |
| 2006/0080356 A1 | 4/2006 | Burges et al. |
| 2006/0091203 A1 | 5/2006 | Bakker et al. |
| 2006/0095516 A1 | 5/2006 | Wijeratne |
| 2006/0100978 A1 | 5/2006 | Heller |
| 2006/0107823 A1 | 5/2006 | Platt et al. |
| 2006/0112098 A1 | 5/2006 | Renshaw et al. |
| 2006/0123052 A1 | 6/2006 | Robbin et al. |
| 2006/0136344 A1 | 6/2006 | Jones et al. |
| 2006/0143236 A1 | 6/2006 | Wu |
| 2006/0156239 A1 | 7/2006 | Jobs et al. |
| 2006/0165571 A1 | 7/2006 | Seon et al. |
| 2006/0168340 A1 | 7/2006 | Heller et al. |
| 2006/0168616 A1 | 7/2006 | Candelore |
| 2006/0173910 A1 | 8/2006 | McLaughlin |
| 2006/0173916 A1 | 8/2006 | Verbeck Sibley et al. |
| 2006/0174008 A1 | 8/2006 | Abanami |
| 2006/0195462 A1 | 8/2006 | Rogers |
| 2006/0195512 A1 | 8/2006 | Rogers et al. |
| 2006/0195513 A1 | 8/2006 | Rogers et al. |
| 2006/0195514 A1 | 8/2006 | Rogers et al. |
| 2006/0195515 A1 | 8/2006 | Beaupre et al. |
| 2006/0195516 A1 | 8/2006 | Beaupre |
| 2006/0195521 A1 | 8/2006 | New et al. |
| 2006/0195581 A1 | 8/2006 | Vaman et al. |
| 2006/0195789 A1 | 8/2006 | Rogers |
| 2006/0195790 A1 | 8/2006 | Beaupre |
| 2006/0206478 A1 | 9/2006 | Glaser |
| 2006/0253874 A1 | 11/2006 | Stark et al. |
| 2006/0265421 A1 | 11/2006 | Ranasinghe et al. |
| 2006/0277098 A1 | 12/2006 | Chung et al. |
| 2006/0282304 A1 | 12/2006 | Bedard et al. |
| 2006/0282311 A1 | 12/2006 | Jiang |
| 2006/0288044 A1 | 12/2006 | Kashiwagi et al. |
| 2006/0288367 A1 | 12/2006 | Swix et al. |
| 2007/0016507 A1 | 1/2007 | Tzara |
| 2007/0043829 A1 | 2/2007 | Dua |
| 2007/0073596 A1 | 3/2007 | Alexander et al. |
| 2007/0100690 A1 | 5/2007 | Hopkins |
| 2007/0101373 A1 | 5/2007 | Bodlaender et al. |
| 2007/0118546 A1 | 5/2007 | Acharya |
| 2007/0136264 A1 | 6/2007 | Tran |
| 2007/0156677 A1 | 7/2007 | Szabo |
| 2007/0156732 A1 | 7/2007 | Surendran et al. |
| 2007/0161402 A1 | 7/2007 | Ng |
| 2007/0162546 A1 | 7/2007 | McLaughlin |
| 2007/0203790 A1 | 8/2007 | Torrens et al. |
| 2007/0244880 A1 | 10/2007 | Martin et al. |
| 2007/0250429 A1 | 10/2007 | Walser |
| 2007/0250761 A1 | 10/2007 | Bradley et al. |
| 2007/0265979 A1 | 11/2007 | Hangartner |
| 2007/0271286 A1 | 11/2007 | Purang |
| 2007/0271287 A1 | 11/2007 | Acharya et al. |
| 2007/0282848 A1 | 12/2007 | Kiilerich et al. |
| 2007/0294096 A1 | 12/2007 | Randall |
| 2008/0004948 A1 | 1/2008 | Flake |
| 2008/0004990 A1 | 1/2008 | Flake |
| 2008/0021851 A1 | 1/2008 | Alcalde |
| 2008/0027881 A1 | 1/2008 | Bisse |
| 2008/0040326 A1 | 2/2008 | Chang et al. |
| 2008/0046317 A1 | 2/2008 | Christianson |
| 2008/0065659 A1 | 3/2008 | Watanabe et al. |
| 2008/0077264 A1 | 3/2008 | Irvin et al. |
| 2008/0082467 A1 | 4/2008 | Meijer et al. |
| 2008/0109378 A1 | 5/2008 | Papadimitriou |
| 2008/0120339 A1 | 5/2008 | Guan et al. |
| 2008/0133601 A1 | 6/2008 | Cervera et al. |
| 2008/0154942 A1 | 6/2008 | Tsai et al. |
| 2008/0155057 A1 | 6/2008 | Khedouri et al. |
| 2008/0155588 A1 | 6/2008 | Roberts et al. |
| 2008/0195438 A1 | 8/2008 | Manfredi |
| 2008/0215173 A1 | 9/2008 | Hicken |
| 2008/0220855 A1 | 9/2008 | Chen et al. |
| 2008/0256106 A1 | 10/2008 | Whitman |
| 2008/0256378 A1 | 10/2008 | Guillorit |
| 2008/0270221 A1 | 10/2008 | Clemens et al. |
| 2009/0006353 A1 | 1/2009 | Vignoli |
| 2009/0024504 A1 | 1/2009 | Lerman et al. |
| 2009/0024510 A1 | 1/2009 | Chen et al. |
| 2009/0048957 A1 | 2/2009 | Celano |
| 2009/0070267 A9 | 3/2009 | Hangartner |
| 2009/0073174 A1 | 3/2009 | Berg et al. |
| 2009/0076939 A1 | 3/2009 | Berg et al. |
| 2009/0076974 A1 | 3/2009 | Berg et al. |
| 2009/0083307 A1 | 3/2009 | Cervera et al. |
| 2009/0089222 A1 | 4/2009 | Ferreira de Castro et al. |
| 2009/0106085 A1 | 4/2009 | Raimbeault |

(56) References Cited

U.S. PATENT DOCUMENTS

| | | |
|---|---|---|
| 2009/0125526 A1 | 5/2009 | Neufeld |
| 2009/0164641 A1 | 6/2009 | Rogers |
| 2009/0210415 A1 | 8/2009 | Martin et al. |
| 2009/0276368 A1 | 11/2009 | Martin et al. |
| 2010/0161595 A1 | 6/2010 | Martin et al. |
| 2010/0169328 A1 | 7/2010 | Hangartner |
| 2011/0119127 A1 | 5/2011 | Hangartner |

FOREIGN PATENT DOCUMENTS

| | | |
|---|---|---|
| EP | 1420388 | 5/2004 |
| EP | 1548741 | 6/2005 |
| JP | 11-052965 | 2/1999 |
| JP | 2002-108351 | 4/2002 |
| JP | 2002-320203 | 10/2002 |
| JP | 2003-255958 | 9/2003 |
| JP | 2004-221999 | 8/2004 |
| JP | 2005-027337 | 1/2005 |
| KR | 2002025579 | 4/2002 |
| WO | 03/036541 | 5/2003 |
| WO | 03/051051 | 6/2003 |
| WO | 2004/070538 | 8/2004 |
| WO | 2004/107757 | 12/2004 |
| WO | 2005/013114 | 2/2005 |
| WO | 2005/106877 | 11/2005 |
| WO | 2005/115107 | 12/2005 |
| WO | 2006/052837 | 5/2006 |
| WO | 2006/075032 | 7/2006 |
| WO | 2006/034218 | 8/2006 |
| WO | 2006/114451 | 11/2006 |
| WO | 2007/038806 | 4/2007 |
| WO | 2007/075622 | 7/2007 |
| WO | 2007/092053 | 8/2007 |
| WO | 2007/134193 | 11/2007 |
| WO | 2009/149046 | 12/2009 |

OTHER PUBLICATIONS

IEEE, no matched results, Nov. 11, 2009, 1 page.
Industry Standard, The, Help FAQs for Standard Prediction Market, http://www.thestandard.com/help, downloaded Jun. 29, 2009.
PCTfES2005f00003 Written Opinion of the International Preliminary Examining Authority dated Mar. 19, 2007.
PCTfES2005f00003 Written Opinion of the International Searching Authority Report dated Jun. 10, 2005.
UK Search Examination Report, App. No. GB1014954.0, mailed Dec. 16, 2010.
PCT/US2006/048330; International Bureau; PCT Search Report and Written Opinion; Mar. 20, 2008; 10 pages.
"Communications of the ACM" Dec. 1992, vol. 35, No. 12 at pp. 26-28 (Introduction to special issue regarding Workshop on High Performance Information Filtering, Morristown, N.J. Nov. 1991), Dec. 1992, 26-28.
"Apple: iTunes 4.2 User Guide for Windows", Dec. 2003; retrieved from the internet: URL: http://www2.austin.cc.tx. us/tcm/projects/itunes.pdf; pp. 10, 17-19. (Added Ref Nov. 5, 2009, Dec. 2003, 10,17-19.
"Architecting Personalized Delivery of Multimedia Information", Communications of the ACM (Dec. 1992).
"Communication from the Examining Division dated Jul. 22, 2011", European Patent Application No. 09169573.4 (8 pages).
"Digital Music Sales Triple to $1.1 Billion in 2005", Maintenance Fees, Feb. 24, 2006, Axcessnews.com available online www.axcessnews.com/modules/wfsection/article.php?articleid=8327, last viewed Feb. 24, 2006.
"Final Office Action dated Jan. 1, 2012", U.S. Appl. No. 12/242,728 (15 pages).
"Final Office Action dated Nov. 10, 2011", U.S. Appl. No. 12/242,768 (10 pages).
"International Search Report and Written Opinion", for PCT application No. PCT/US2012/057660, 28 pages.

"iTunes Sync is Syncing the Music Playlist One Way Only for iPhone. How to Fix it?", Jul. 25, 2011,3 pages.
"Lessons from LyricTimeTM: A Prototype Multimedia System" 4th IEEE ComSoc International Workshop on Multimedia Communications (Apr. 1992).
"New Music Recommendation System is Based on FOAF Personal Profiling," www.masternewmedia.org/music_recommendation/music_recommendation_system_FOAF, Oct. 1, 2005.
"Non-Final Office Action dated Feb. 16, 2012", U.S. Appl. No. 12/242,758.
"Non-Final Office Action dated Feb. 9, 2012", U.S. Appl. No. 12/646,916 (13 pages).
"Non-Final Office Action dated Jan. 9, 2012", U.S. Appl. No. 12/242,735 (12 pages).
"Not Your Average Jukebox", www.alwayson-network.com/comments.php?id=P12663 0 37 0 C, Web Page, Not Your Average Jukebox, On Hollywood 1000 contender Ecast uses broadbank to being the digital media experience to your watering hole. Posted Nov. 4, 2005.
"PCT International Preliminary Report on Patentability (Ch II) dated May 22, 2007", PCT Application No. PCT/ES2005/00003, May 22, 2007.
"PCT International Preliminary Report on Patentability (Ch. II) dated Nov. 15, 2007", PCT Application No. PCT/US2005/000213, Nov. 15, 2007.
"PCT International Search Report and Written Opinion dated Nov. 8, 2010", PCT Application No. PCT/US2010/47955, (16 pages).
"PCT International Search Report and Written Opinion dated Dec. 7, 2007", PCT Application No. PCT/US2007/068708, Dec. 7, 2007, (6 pages).
"PCT International Search Report and Written Opinion dated Feb. 17, 2010", PCT Application No. PCT/US09/068604, Feb. 17, 2010.
"PCT International Search Report and Written Opinion dated May 28, 2008", PCT Application No. PCT/US2006/003795, May 28, 2008.
"PCT International Search Report and Written Opinion dated Jun. 5, 2009", PCT Application No. PCT/US09/42002, Jun. 5, 2009.
"PCT International Search Report and Written Opinion dated Jul. 15, 2009", PCT Application No. PCT/US2009/45911, Jul. 15, 2009.
"PCT International Search Report dated Oct. 23, 2009", PCT Application No. PCT/US2006/004257, Oct. 23, 2009.
"PCT International Search Report dated Feb. 9, 2007", PCT Application No. PCT/US2006/034218, Feb. 9, 2007, (3 pages).
"PCT International Search Report dated Mar. 25, 2008", PCT Application No. PCT/US2006/38769, Mar. 25, 2008, (3 pages).
"PCT International Search Report dated Jul. 15, 2009", PCT Application No. PCT/US2009/45725, Jul. 15, 2009.
"PCT International Search Report Dated Sep. 4, 2009", PCT Application No. PCT/US2009/051233, Sep. 4, 2009.
"PCT International Written Opinion dated Aug. 10, 2008", PCT Application No. PCT/US2006/034218, Aug. 10, 2008, (5 pages).
"PCT Written Opinion of the International Searching Authority dated Jan. 12, 2006", PCT Application No. PCT/ES2005/000213, Jan. 12, 2006.
"RFID Brings Messages to Seattle Sidewalks", www.rfidjournal.comfarticle/articleview/1619/1/1, Web Page, RFID brings messages to Seattle side walks on RFID system being deployed next week will send marketing and assistive information to users carrying active RFID tags. RFID Journal (pp. 1-4), May 26, 2004, 1-4.
"Social Networking Meets Music Listening: Mecora Launches Radio 2.0," www.masternewmedia.org/news/2006/04/13/social_networking_meets_music_listening.htm, Apr. 13, 2006.
"TouchTunes Signs License Agreement for BMI Music in Digital Jukeboxes", www.bmi.com/news/200403/20040324b.asp, Web Page, BMI™ Figures Don't Lie, Mar. 24, 2004, Touch Tunes Signs License Agreement for BMI Music in Digital Jukeboxes, Mar. 24, 2004.
"Treemap", Treemap, University of Maryland, http://www.cs.umd.edu/hcil/treemap/, last udpated Aug. 5, 2003, 4 pages.
"Variations 2", The Trustees of Indiana University, Variations 2, The Indiana University Digital Music Library, http://dml.indiana.edu/, last updated May 11, 2005, 1 page.

(56) References Cited

OTHER PUBLICATIONS

"Will iCloud Sync Which Playlist I Put Purchased Songs In?", Aug. 8, 2011, 1 page.
Alvear, Jose, ""Risk-Free Trial Streaming Media Delivery Tools,"", Streaming Media.com; www.streamingmedia.com/ article. ap?id=5768, Jun. 30, 2000.
Baluja, S et al., "Video Suggestion and Discovery for YouTube: Taking Random Walks through the View Graph", Baluja, S., Seth, R., Sivakumar, D., Jing, Y., Yagnik, J., Kumar, S., Ravichandran, D., and Aly, M. In WWW '08: Proceedings of the 17th International conference o, 2008, 895-904.
Belkins, et al., ""Information Filtering and Information Retrieval: Two Sides of the Same Coin?"", Communications of the ACM (Dec. 1992).
Bender, ""Twenty Years of Personalization: All about the Daily Me,"", Educause Review (Sep./Oct. 2002).
Bender, et al., "Newspace: Mass Media and Personal Computing", Proceedings of USENIX, Conference, pp. 329-348(Summer 1991).
Bollen, Johan et al., "Toward alternative metrics of journal impact: a comparison of download and citation data", Johan Bollen, Herbert Van de Sompel, Joan Smith, Rick Luce, Google.com, 2005, pp. 1-2.
Bunzel, Tom, "Easy Digital Music", QUE Publisher, Aug. 18, 2004, Chapters 5 and 8.
Cano, Pedro et al., "On the Use of FastMap for Audio Retrieval and Browsing", The International Conference on Music Information Retrieval and Related Activities (ISMIR 2002), Paris, France, Oct. 2002,2 pages.
Carlson, et al., "Internet Banking Market Developments and Regulatory Issues in the New Economy: What Changed, and the Challenges for Economic Policy . . . ", May 2001; http://www.occ.gov/netbank/SGEC2000.pdf, May 2001, 33 pages.
Chao-Ming et al. (Chao-Ming), Design and Evaluation and mProducer: a Mobile Authoring Tool for Personal Experience Computing [online], MUM 2004, College Park, Maryland, USA, Oct. 27-29, 2004 [retrieved on Dec. 17, 2010]. [http://citeseerx.ist.psu.edu/vie, [http://citeseerx.ist.psu.edu/viewdoc/download?doi=10.1.1.131.2933&rep=rep1&type=pdf], Oct. 27-29, 2004.
Connell, Lain et al., "Ontological Sketch Models: Highlighting User-System Misfits", In P. Palanque, E. O'Neill and P. Johnson, editors, Proceedings of Human Computer Interaction (HCI) Bath, England, Sep. 2003, London Springer, pp. 1-16.
Das, A et al., "Google News Personalization: Scalable Online Collaborative Filtering", Das,A., Datar,M., Garg,A., and Rajaram,S. In WWW '07: Proceedings of the 16th international conference on World Wide Web, pp. 271-280, New York, NY, D USA, 2007. ACM Press, 2007, 271-280.
Dean, J et al., "MapReduce: Simplied Data Processing on Large Clusters", Dean, J. and Ghemawat, S. Commun. ACM, 51(1):107-113, 2008.
Dempster, Y, "Maximum Likelihood from Incomplete Data via the EM Algorithm", Dempster, Y., Laird, N., and Rubin, D. Jour. of the Royal Stat. Soc., Ser. B., 39:1047-1053,1977.
Deshpande, Mukund et al., "Item-Based Top-N Recommendation Algorithms", ACM Transactions on Information Systems, 22:1 (Jan. 2004), pp. 143-177.
Hofmann, T, "Latent Semantic Models for Collaborative Filtering", ACM Transactions on Information Systems, 22:89-115,2004.
Hofmann, T, "Unsupervised Learning by Probabilistic Latent Semantic Analysis", Mach. Learn., 42:177-196, 2001.
Indyk, P. et al., "Low-Distortion Embeddings of Finite Metric Spaces", Indyk, P. and Matousek, J. In Handbook of Discrete and Computational Geometry, pp. 177-196. CRC Press, 2004.
Jacucci, Giulio et al., "IP City, Integrated Project on Interaction and Presence on Urban Environments-Demonstrators on Large-Scale Events Applications", ipcity.eu; Giulio Jacucci, John Evans, Tommi Ilmonen; pp. 1-37; Feb. 9, 2007.
Lazar, N A., "Bayesian Empirical Likelihood", Technical Report, Carnegie Mellon University, Department of Statistics, 2000; 26 pages, 2000.
Lie, "The Electronic Broadsheet—All the News That Fits the Display", MIT Master's Thesis, pp. 1-96 (Jun. 1991).
Lippman, et al., "News and Movies in the 50 Megabit Living Room", IEEE/IEICE, Global Telecommunications Conference, pp. 1976-1981 (Nov. 15, 1987).
Loeb, Shoshana, "Delivering Interactive Multimedia Documents over Networks", IEEE Communications Magazine; May 1992; 8 pages.
Logan, Beth, "A Music Similarity Function Based on Signal Analysis", Logan, Beth et al., IEEE International Conference on Multimedia and Expo (ICME), Tokyo, Japan, Aug. 2001, IEEE Press, pp. 952-955, Aug. 2001.
Logan, Beth, "Content-Based Playlist Generation: Exploratory Experiments", The International Conference on Music Information Retrieval and Related Activities (ISMIR 2002), Paris, France, Oct. 2002,2 pages.
Maidin, Donncha et al., "The Best of Two Worlds: Retrieving and Browsing", Proceedings of the COST G-6 Conference on Digital Audio Effects (DAFX-OO), Verona, Italy, Dec. 7-9, 2000,4 pages.
McCarthy, et al., "Augmenting the Social Space of an Academic Conference", Information School, University of Washington and Department of Computer Science and Engineering, University of Minnesota; pp. 1-10; Nov. 6-10, 2004.
Na, Australia Examiner's 1st Report on patent application No. 2010212503 mailed Jun. 27, 2011.
Notess, Mark et al., Variations2: Toward Visual Interface for Digital Music Libraries, Second International Workshop on Visual Interfaces to Digital Libraries, 2002, 6 pages, 2002.
O'Connor, M et al., "PolyLens: A Recommender System for Groups of Users", M. O'Connor, D. Cosley, J.A. Konstan, J. Riedl; European Conference on Computer Supported Co-Operative Work at Bonn, Germany; Published 2001; pp. 199-218, 2001.
Olma, Alex, "Erfolgreich bei iTunes Match Angemeldt", Sep. 16, 2011, 2 pages.
Orwant, J, "Appraising the User of User Models: Doppelganger's Interface", Jon Orwant, in: A. Kobsa and D. Litman (eds.), Proceeding of the 4th International Conference on User Modeling (1994).
Orwant, Jonathon L., "Doppelganger Goes to School: Machine Learning for User Modeling", MIT Master of Science Thesis (Sep. 1993).
Orwant, Jonathon L., "Doppelganger: A User Modeling System", MIT Bachelor's Thesis (Jun. 1991).
Pachet, Francois et al., "A Taxonomy of Musical Genres, Content-Based Multimedia Information Access Conference (RIAO)", Paris, Apr. 2000, 8 pages.
Paek, Tim et al., "Toward University Mobile Interaction for Shared Displays", Microsoft Research, Redmond, WA; pp. 1-4; Nov. 6-10, 2004. Retrieved from the internet: <URL: http://research.microsoft.com/-timpaekiPapers/cscw2004. pdf> entire document, Nov. 2004, 1-4.
Pampalk, Elias et al., "Content-based Organization and Visualization of Music Archives", ACM Multimedia, Juan les Pins, France, Dec. 2002, pp. 570-579.
Pauws, Steffen et al., "PATS: Realization and User Evaluation of an Automatic Playlist Generator", The International Conferences on Music Information Retrieval and Related Activities (ISMIR 2002), Paris, France, Oct. 2002, 9 pages.
Platt, John C. et al., "Learning a Gaussian Process Prior for Automatically Generating Music Playlists", Microsoft Corporation {platt, cburgess, sswenson, chriswea}@microsoft.com, alcez@cs.berkeley.edu, 2002; pp. 1-9.
Platt, John S., "Fasting Embedding of Sparse Music Similarity Graphs", Microsoft Corporation, {jplatt@microsoft.com}; 2004.
Rauber, Andreas et al., "The SOM-enhanced JukeBox: Organization and visualization of Music Collections Based on Perceptual Models", Journal of New Music Research, vol. 32, Nov. 2, 2003, pp. 193-210.
Rudstrom, Asa, "Co-Construction of Hybrid Spaces", A Dissertation submitted to the University of Stockholm in partial fulfillment of the requirements for the Degree of Doctor of Philosophy; Department of Computer and Systems Sciences Stockholm University and, Nov. 2005, 1-69.

(56) References Cited

OTHER PUBLICATIONS

Scheible, Jurgen et al., "MobiLenin—Combining a Multi-Track Music Video, Personal Mobile Phones and a Public Display into Multi-User Interactive Entertainment", Media Lab, University of Art and Design, Helsinki, Finland; pp. 1-10; Nov. 6-10, 2005.

Scihira, I, "A Characterization of Singular Graphs", Electronic Journal of Linear Algebra, 16:451-462, 2007.

Shneiderman, Ben, "Tree Visualization with Tree-Maps: 2-d Space-Filling Approach", ACM Transactions on Graphics, vol. 11, No. 1, Jan. 1992, pp. 92-99.

Shneiderman, Ben, "Treemaps for Space-Contrained Visualization of Hierarchies", http://www.sc.umd.edu/heil/treemap- history, last updated Apr. 28, 2006, 16 pages, Apr. 28, 2006.

Smart Computing, "The Scoop on File-Sharing Services", Dec. 2000, vol. 11, Issue 12; pp. 30-33 in printed issue. Available at www.smartcomputing.com/editorial/article.asp?article=articles%2F2000%Fs1112%2FOBs12.asp, Dec. 2000, 30-33.

Strands Business Solutions, "Integration Document v.2.0", Published May 2008; [online retrieved on Jan. 21, 2010] Retrieved from the internet <URL: http://recommender.strands.com/doc/SBS-Integration-Document.pdf>; entire document—18 pages, May 2008.

Sun, Jimeng et al., "Incremental tensor analysis: theory and applications", Jimeng Sun, Dacheng Tao, Spiros Papadimitriou, Philip Yu, Christos Faloutsos, ACM, Oct. 2008, pp. 1-37.

Thompson, John, "A Graphic Representation of Interaction With the NEXIS News Database", MIT Thesis (May 1983).

Tzanetakis, George et al., "A Prototype Audio Browser-Editor Using a Large Scale Immersive Visual and Audio Display", Tzanetakis, George et al., MARSYAS3D: A Prototype Audio Browser-Editor Using a Large Scale Immersive Visual and Audio Display, Proceedings of the 2001 International Conference on Auditory Display, Espoo, Finland, Jul./Aug. 2001, 5 pages.

Wolfers, Justin et al., "Prediction Markets", Wolfers, Justin and Zitzewitz, Eric, Journal of Economic Perspectives, Spring 2004, pp. 107-126, vol. 18, No. 2.

Yates, Alexander et al., "ShopSmart; Product Recommendations through Technical Specifications and User Reviews", Temple University; CIKM; Oct. 26-30, 2008, Napa Valley, CA, USA; 2 pages, Oct. 2008.

Yen, Yi-Wyn, "Apple announces a 32GB iPhone 3G by Jun. 15, 2009", The Industry Standard, Apr. 2, 2009, http://www.thestandard.com/preditions/channel/hardware, downloaded Apr. 8, 2009, Apr. 2, 2009.

RECOMMENDER SYSTEM FOR IDENTIFYING A NEW SET OF MEDIA ITEMS RESPONSIVE TO AN INPUT SET OF MEDIA ITEMS AND KNOWLEDGE BASE METRICS

RELATED APPLICATIONS

This application is a Continuation of U.S. Patent application Ser. No. 12/685,639, filed on Jan. 11, 2010, now U.S. Patent No. 8,312,017, which is a Continuation of U.S. patent application Ser. No. 11/346,818, filed Feb. 3, 2006, now U.S. Patent No. 7,734,569, which also claims benefit from U.S. Provisional Application No. 60/649,987 filed Feb. 3, 2005, each of which are incorporated herein in their entireties by this reference.

COPYRIGHT NOTICE

© 2005-2006 MusicStrands, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

This invention relates generally to systems and methods for recommending media items to a user in a personalized manner. It particularly relates to "recommender" computer software systems for media items which are grouped by end users to define mediasets.

BACKGROUND OF THE INVENTION

New technologies combining digital media item players with dedicated software, together with new media distribution channels through computer networks (e.g., the Internet) are quickly changing the way people organize and play media items. As a direct consequence of such evolution in the media industry, users are faced with a huge volume of available choices that clearly overwhelm them when choosing what item to play in a certain moment.

This overwhelming effect is apparent in the music arena, where people are faced with the problem of selecting music from very large collections of songs. However, in the future, we might detect similar effects in other domains such as music videos, movies, news items, etc.

In general, our invention is applicable to any kind of media item that can be grouped by users to define mediasets. For example, in the music domain, these mediasets are called playlists. Users put songs together in playlists to overcome the problem of being overwhelmed when choosing a song from a large collection, or just to enjoy a set of songs in particular situations. For example, one might be interested in having a playlist for running, another for cooking, etc.

Different approaches can be adopted to help users choose the right options with personalized recommendations. One kind of approach is about using human expertise to classify the media items and then use these classifications to infer recommendations to users based on an input mediaset. For instance, if in the input mediaset the item x appears and x belongs to the same classification as y, then a system could recommend item y based on the fact that both items are classified in a similar cluster. However, this approach requires an incredibly huge amount of human work and expertise.

Another approach is to analyze the data of the items (audio signal for songs, video signal for video, etc) and then try to match users preferences with the extracted analysis. This class of approaches is yet to be shown effective from a technical point of view.

Hosken (U.S. Pat. No. 6,438,579) describes a system and method for recommending media items responsive to query media items based on the explicit and implicit user characterizations of the content of the media items. Dunning, et. al. (U.S. Patent Application Pubs 2002/0082901 and 2003/0229537) disclose a system and method for discovering relationships between media items based on explicit and implicit user associations between said items. The present invention differs from Hosken and Dunning, et. al. in that it provides an automatic way to discover relationships between media items without requiring any user rating or any other knowledge from the user.

Lazarus et. al. (U.S. Pat. No. 6,134,532) describe a system and method for providing individually targeted advertising items to users based on observations of user behavior as quantified by representations for important content words in text-bearing materials accessed by a user. Advertising items responsive to the observed behavior of a user are identified by explicitly characterizing content words in the advertisement and by further characterizing candidate responsive items selected in this manner based on observations of user responses to them. Behrens et al. (U.S. Pat. No. 6,615,208) describe a method for associating textual materials similar to that of Lazarus et. al. for recommending items for purchase to a user based on the observed purchasing behavior of the user. The present invention differs from Lazarus et. al. and Behrens et. al. in that it is not based on user behavior other than how users in general associate items to form mediasets. Furthermore, Lazarus et al. and Behrens et. al. use standard methods for analyzing textual materials and the associated vector-space techniques as the basis for quantifying associations between textual representations of user behavior and textual content of advertising items while the present invention uses novel variants of associational methods for media items as the basis for associating media items.

Aggarwal and Yu (U.S. Pat. No. 6,487,539) describe a system for providing product recommendations to users based on extracting characterizations of products from textual descriptive materials about product features. Users are clustered with others users based on observed purchasing behaviors and the extracted descriptions of products purchased by a cluster of users are matched to extracted descriptions of other products and most similar products recommended to a user that is associated with that cluster of users. The present invention differs from Aggarwal and Yu in that the associations among media items are not based on characterizations of the items themselves, but rather on how they are grouped together.

Robinson (U.S. Pat. No. 5,918,014) describes a system and a process for presenting users of the World Wide Web with targeted advertising. Users are clustered based on observed web browsing of sites and purchasing activities while advertisements of probable interest to the users in a cluster are identified by presenting ads to users identified with the cluster and observing the interest of users in the advertisement as expressed by exploration of the ad and purchasing activity. Ads are selected for presentation to a specific user by first associating the user with an identified community, and then selecting from the ads associated with that community those, which conform more closely to the specific characteristics of the user, utilized to associate the user with the community. The present invention differs from Robinson in that media items are not identified for potential presentation based on the acceptance of the media item in response to random presentation to a group of users representative of the user, media items for presentation are instead affirmatively identified by the media items they contain.

BRIEF SUMMARY OF PRESENTLY PREFERRED EMBODIMENTS

This invention addresses the problem of assisting users in building their mediasets by recommending media items that go well together with an initial (or input) mediaset. The recommendation is computed using metrics among the media items of a knowledge base of the system. This knowledge base comprises collections of mediasets from a community of users. (As explained below, a mediaset is not a collection of media items or content. Rather, it is a list of such items, and may include various metadata.) Preferably, the methods of the present invention are implemented in computer software.

In commercial applications, the invention can be deployed in various ways. Recommender services can be provided, for example, to remote users of client computing machines via a network of almost any kind, wired or wireless. Here we use "computing machines" to include traditional computers, as well as cell phones, PDA's, portable music players etc. The knowledge base of the system, a database, can be local or remote from the user. It may be at one location or server, or distributed in various ways.

The invention in one aspect embodies a system for identifying a set of media items in response to an input set of media items. The system requires a knowledge base consisting of a collection of mediasets. Mediasets are sets of media items, which are naturally grouped by users. They reflect the users subjective judgments and preferences. The mediasets of the knowledge base define metrics among items. Such metrics indicate the extent of correlation among media items in the mediasets of the knowledge base.

Various different metrics between and among media items can be generated from the knowledge base of mediasets. Such metrics can include but are not limited to the follow examples:
  a) Pre-concurrency (for ordered mediasets) between two items is computed as the number of times a given item precedes the other item in the mediasets of the knowledge base.
  b) Post-concurrency (for ordered mediasets) between two items is computed as the number of times an item follows another item in the mediasets of the knowledge base.
  c) Co-concurrency between two items is computed as the number of times the items appear together in a mediaset.
  d) Metadata similarities may be computed as well by considering keywords associated with the media items such as artist, actor, date, etc.
  e) Combinations of the previous metrics can be useful.
  f) Combinations of the previous metrics applying transitivity.

Such metrics can be represented in an explicit form that directly associates media items with other media items. For each media item of the input set, the system retrieves n media items with highest metrics. These media items are called candidates. Then, the recommended set of media items is a subset of the candidates that maximize an optimization criterion. Such criterion can be simply defined using the metrics of the knowledge base of the system. Furthermore, such criterion can also include filters including but not limited to:
  a) Filters that the user expresses to focus the recommendation only on a determined type of items.
  b) Filters that the user expresses to focus the recommendations on items that meet certain keyword-based criteria, such as a specific artist/s, year/s, genre/s, etc.
  c) Filters that personalize the recommendations to the user. This kind of filtering includes recommending only items that the user knows about, or only items that the user does not know about, etc.

Additional aspects and advantages will be apparent from the following detailed description of preferred embodiments, which proceeds with reference to the accompanying drawings.

DETAILED DESCRIPTION OF PREFERRED EMBODIMENTS

Figure 1A:
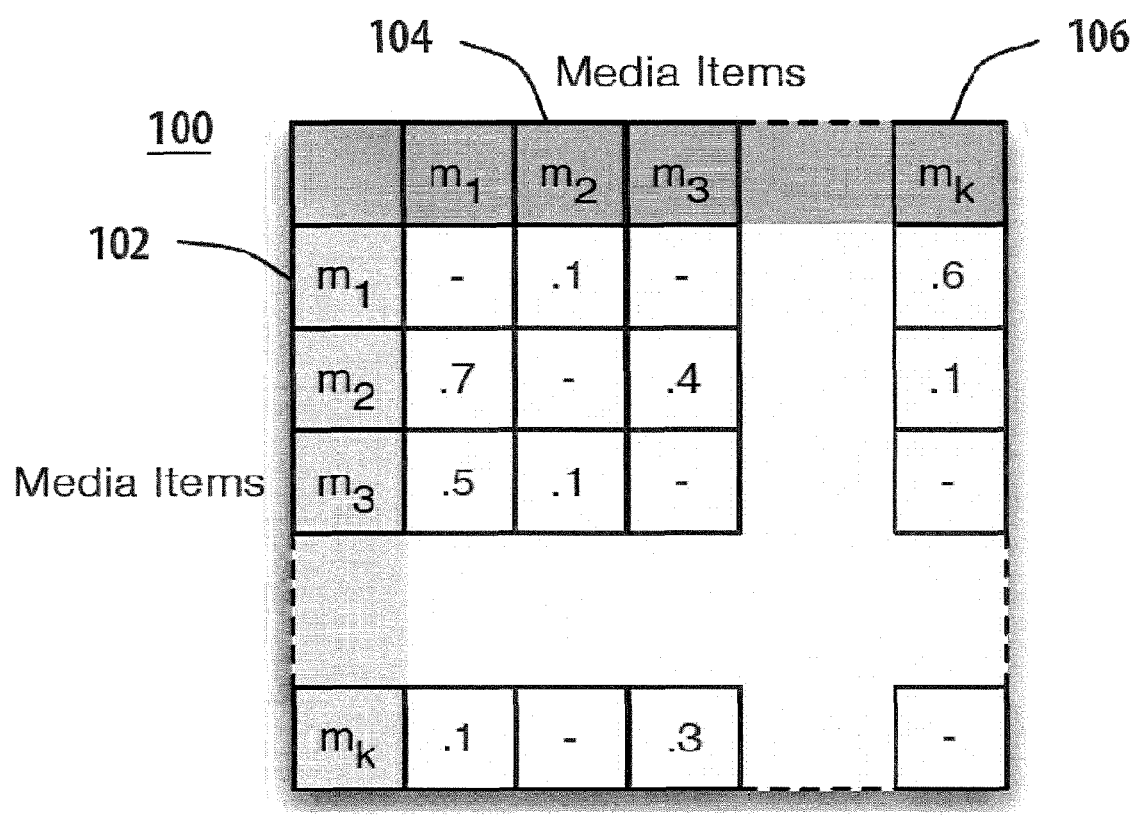
FIG. 1A is a representation in matrix form of a metric describing the similarity values between collections of media items.

Reference is now made to the figures in which like reference numerals refer to like elements. For clarity, the first digit of a reference numeral indicates the figure number in which the corresponding element is first used.

In the following description, certain specific details of programming, software modules, user selections, network transactions, database queries, database structures, etc. are omitted to avoid obscuring the invention. Those of ordinary skill in computer sciences will comprehend many ways to implement the invention in various embodiments, the details of which can be determined using known technologies.

Furthermore, the described features, structures, or characteristics may be combined in any suitable manner in one or more embodiments. In general, the methodologies of the present invention are advantageously carried out using one or more digital processors, for example the types of microprocessors that are commonly found in servers, PC's, laptops, PDA's and all manner of desktop or portable electronic appliances.

Definitions

The system preferably comprises or has access to a knowledge base which is a collection of mediasets. A mediaset is a list of media items that a user has grouped together. A media item can be almost any kind of content; audio, video, multimedia, etc., for example a song, a book, a newspaper or magazine article, a movie, a piece of a radio program, etc. Media items might also be artists or albums. If a mediaset is composed of a single type of media items it is called a homogeneous mediaset, otherwise it is called a heterogeneous mediaset. A mediaset can be ordered or unordered. An ordered mediaset implies a certain order with respect to the sequence in which the items are used[1] by the user. Note again that a mediaset, in a preferred embodiment, is a list of media items, i.e. meta data, rather than the actual content of the media items. In other embodiments, the content itself may be included. Preferably, a knowledge base is stored in a machine-readable digital storage system. It can employ well-known database technologies for establishing, maintaining and querying the database.

1 Depending on the nature of the item, it will be played, viewed, read, etc.

In general, mediasets are based on the assumption that users group media items together following some logic or reasoning, which may be purely subjective, or not. For example, in the music domain, a user may be selecting a set of songs for driving, hence that is a homogeneous mediaset of songs. In this invention, we also consider other kinds of media items such as books, movies, newspapers, and so on. For example, if we consider books, a user may have a list of books for the summer, a list of books for bus riding, and another list of books for the weekends. A user may be interested in expressing a heterogeneous mediaset with a mix of books and music, expressing (impliedly) that the listed music goes well with certain books.

A set of media items is not considered the same as a mediaset. The difference is mainly about the intention of the user in grouping the items together. In the case of a mediaset the user is expressing that the items in the mediaset go together well, in some sense, according to her personal preferences. A common example of a music mediaset is a playlist. On the other hand, a set of media items does not express necessarily the preferences of a user. We use the term set of media items to refer to the input of the system of the invention as well as to the output of the system.

A metric M between a pair of media items i and j for a given knowledge base k expresses some degree of relation between i and j with respect to k. A metric may be expressed as a "distance," where smaller distance values (proximity) represent stronger association values, or as a similarity, where larger similarity values represent stronger association values. These are functionally equivalent, but the mathematics are complementary. The most immediate metric is the co-concurrency (i, j, k) that indicates how many times item i and item j appear together in any of the mediasets of k. The metric pre-concurrency (i, j, k) indicates how many times item i and item j appear together but i before j in any of the mediasets of k. The metric post-concurrency (i, j, k) indicates how many times item i and item j appear together but only i after j in any of the mediasets of k. The previous defined metrics can also be applied to considering the immediate sequence of i and j. So, the system might be considering co/pre/post-concurrencies metrics but only if items i and j are consecutive in the mediasets (i.e., the mediasets are ordered). Other metrics can be considered and also new ones can be defined by combining the previous ones.

A metric may be computed based on any of the above metrics and applying transitivity. For instance, consider co-concurrency between item i and j, co(i,j), and between j and k, co(j,k), and consider that co(i,k)=0. We could create another metric to include transitivity, for example d(i,k)=1/co(i,j)+1/co(j,k). These type of transitivity metrics may be efficiently computed using standard branch and bound search algorithms. This metric reveals an association between items i and k notwithstanding that i and k do not appear within any one mediaset in K.

A matrix representation of metric M, for a given knowledge base K can be defined as a bidimensional matrix where the element M(i, j) is the value of the metric between the media item i and media item j.

A graph representation for a given knowledge base k, is a graph where nodes represent media items, and edges are between pairs of media items. Pairs of media items i, j are linked by labeled directed edges, where the label indicates the value of the similarity or distance metric M(i,j) for the edge with head media item i and tail media item j.

Preferred Embodiments Of The Invention

Figure 2:
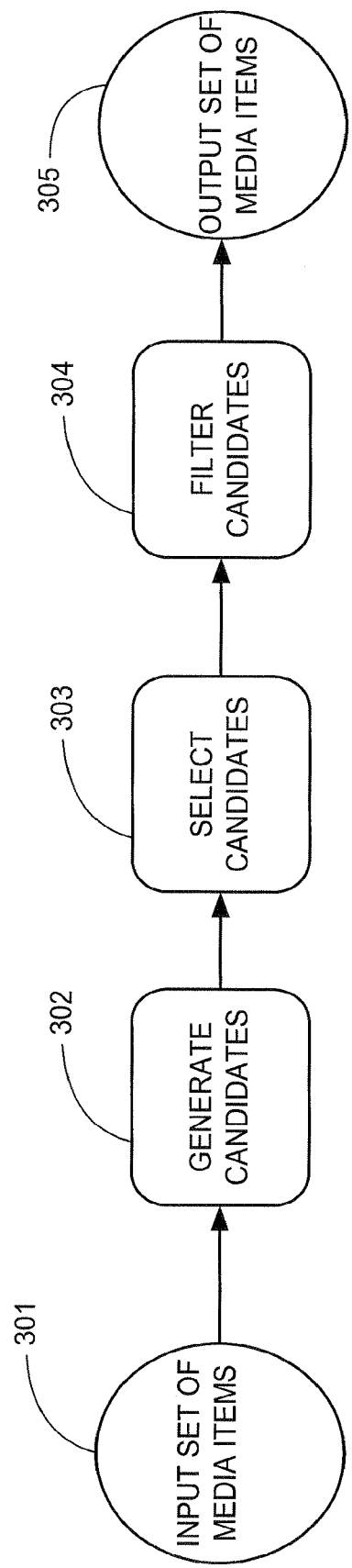
FIG. 2 is a block diagram of one method for selecting a set of media items corresponding to an initial set of media items in accordance with an embodiment of the invention.

One embodiment of the invention is illustrated by the flow diagram shown in FIG. 2. This method accepts an input set 301 of media items. Usually, this is a partial mediaset, i.e. a set of media items (at lease one item) that a user grouped together as a starting point with the goal of building a mediaset. A first collection of candidate media items most similar to the input media items is generated by process 302 as follows.

Figure 3:
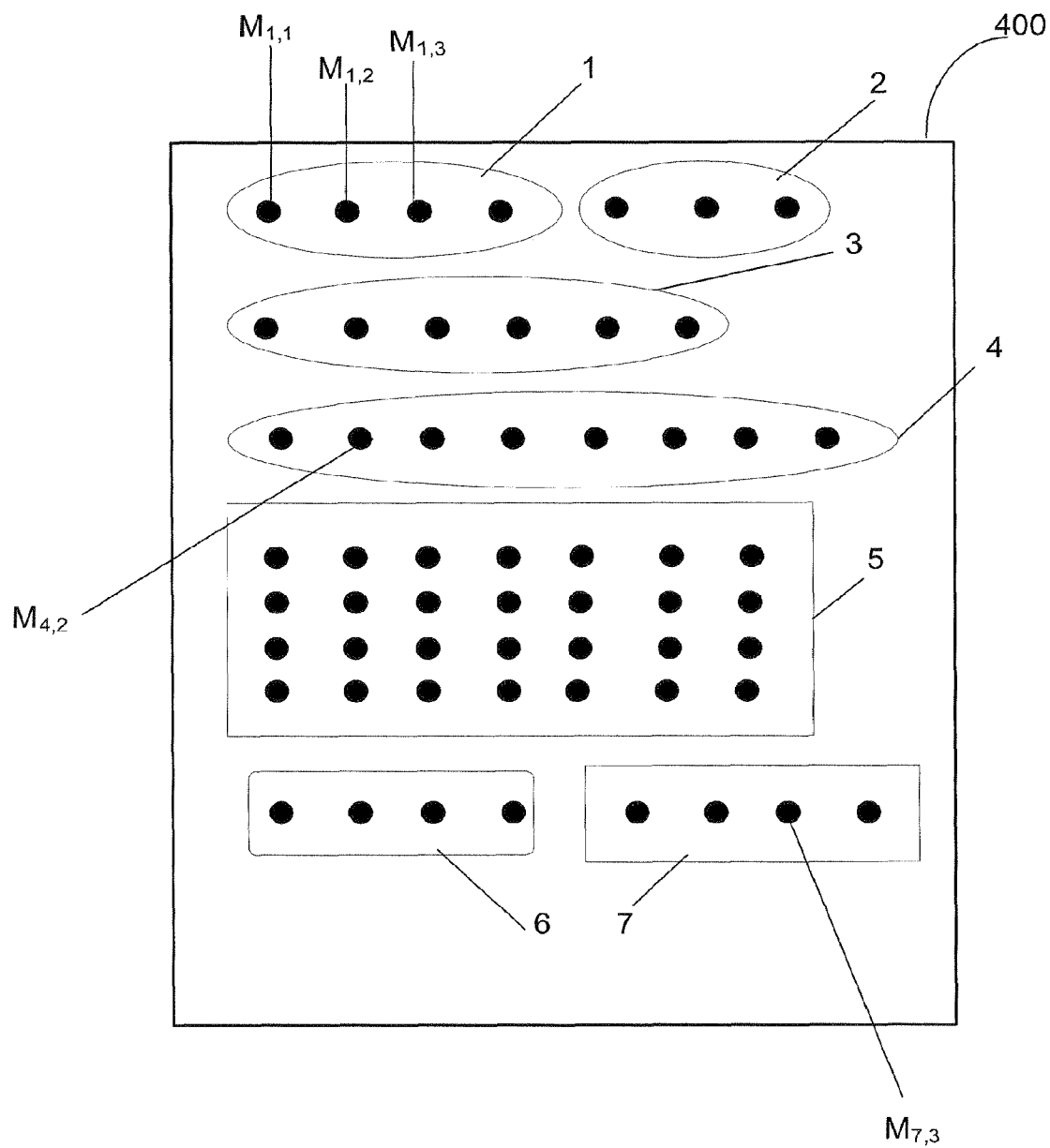
FIG. 3 is a simplified, conceptual diagram of a knowledge base or database comprising a plurality of mediasets.

As a preliminary matter, in a presently preferred embodiment, a pre-processing step is carried out to analyze the contents of an existing knowledge base. This can be done in advance of receiving any input items. As noted above, the knowledge base comprises an existing collection of mediasets. This is illustrated in FIG. 3, which shows a simplified conceptual illustration of a knowledge base 400. In FIG. 3, the knowledge base 400 includes a plurality of mediasets, delineated by rectangles [or ovals] and numbered 1 through 7. Each mediaset comprises at least two media items. For example, mediaset 2 has three items, while mediaset 7 has five items. The presence of media items within a given mediaset creates an association among them.

Pre-processing analysis of a knowledge base can be conducted for any selected metric. In general, the metrics reflect and indeed quantify the association between pairs of media items in a given knowledge base. The process is described by way of example using the co-concurrency metric mentioned earlier. For each item in a mediaset, the process identifies every other item in the same mediaset, thereby defining all of the pairs of items in that mediaset. For example, in FIG. 3, one pair in set 1 is the pair M(1,1)+M(1,3). Three pairs are defined that include M(1,1). This process is repeated for every mediaset in the knowledge base, thus every pair of items that appears in any mediaset throughout the knowledge base is defined.

Next, for each pair of media items, a co-concurrency metric is incremented for each additional occurrence of the same pair of items in the same knowledge base. For example, if a pair of media items, say the song "Uptown Girl" by Billy Joel and "Hallelujah" by Jeff Buckley, appear together in 42 different mediasets in the knowledge base (not necessarily adjacent one another), then the co-concurrency metric might be 42 (or some other figure depending on the scaling selected, normalization, etc. In some embodiments, this figure or co-concurrency "weight" may be normalized to a number between zero and one.

Referring now to FIG. 1A, matrix 100 illustrates a useful method for storing the metric values or weights for any particular metric. Here, individual media items in the knowledge base, say $m_1, m_2, m_3 \ldots m_k$ are assigned corresponding rows and columns in the matrix. In the matrix, the selected metric weight for every pair of items is entered at row, column location x,y corresponding to the two media items defining the pair. In FIG. 1A, the values are normalized.

Now we assume an input set of media items is received. Referring again to process step 302, a collection of "candidate media items" most similar to the input media items is generated, based on a metric matrix like matrix 100 of FIG. 1A. For instance, for each media item, say (item $m_2$) in the input set 301, process 302 could add to a candidate collection of media items every media item ($m_1, m_3 \ldots m_k$ in FIG. 1A) that has a non-zero similarity value, or exceeds a predetermined threshold value, in the corresponding row 102 of metric matrix 100 for the media item $m_2$, labeling each added media item with the corresponding metric value (0.7, 0.4 and 0.1, respectively). See the edges in FIG. 1B. For each media item in the input set of size m, process 302 selects n media items as candidates; thus the aggregation of all the candidates produces a set of at most m * n media items.

Process 303 receives the candidate set from process 302 which contains at the most m * n media items. This component selects p elements from the m * n items of the candidate set. This selection can be done according to various criteria. For example, the system may consider that the candidates should be selected according to the media item distribution that generated the candidate set. This distribution policy may be used to avoid having many candidates coming from very few media items. Also, the system may consider the popularity of the media items in the candidate set. The popularity of a media item with respect to a knowledge base indicates the frequency of such media item in the mediasets of the knowledge base.

Finally, from the second collection of [p] media items, a third and final output set 305 of some specified number of media items is selected that satisfy any additional desired external constraints by a filter process 304. For instance, this step could ensure that the final set of media items is balanced with respect to the metrics among the media sets of the final set. For example, the system may maximize the sum of the metrics among each pair of media items in the resulting set. Sometimes, the system may be using optimization techniques when computation would otherwise be too expensive. Filtering criteria such as personalization or other preferences expressed by the user may also be considered in this step. In some applications, because of some possible computational constraints, these filtering steps may be done in the process 303 instead of 304. Filtering in other embodiments might include genre, decade or year of creation, vendor, etc. Also, filtering can be used to demote, rather then remove a candidate output item.

Figure 1B:
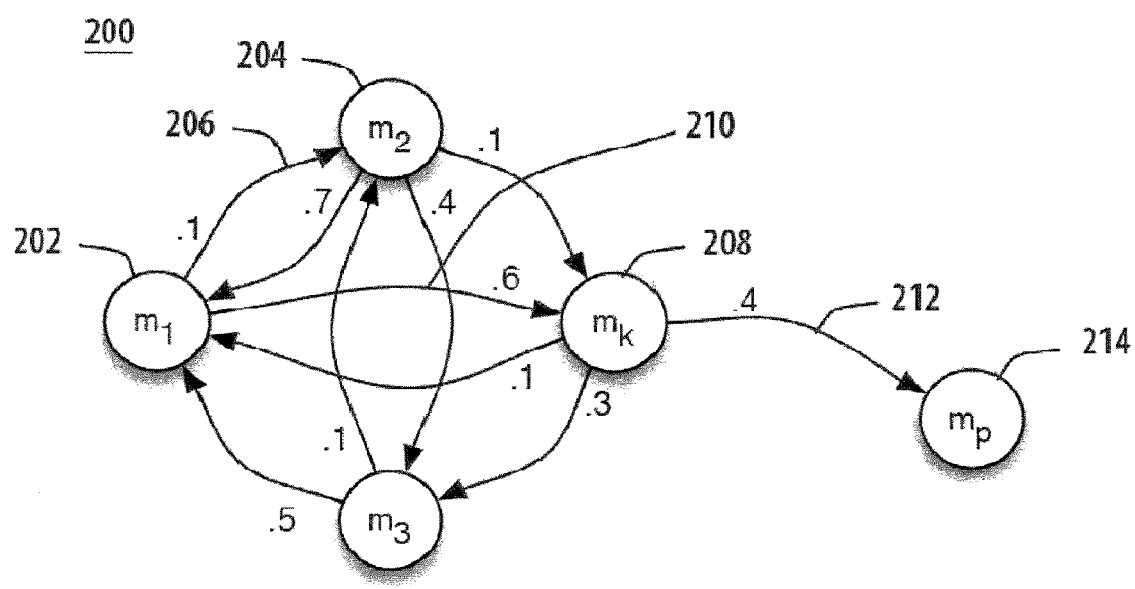
FIG. 1B provides a weighted graph representation for the associations within a collection of media items. Each edge between two media items is annotated with a weight representing the value of the metric for the similarity between the media items.

In another embodiment or aspect of the invention, explicit associations including similarity values between a subset of the full set of media items known to the system, as shown in graph form in FIG. 1B, may be used. To illustrate, if the similarity value between a first media item 202, generally denoted below by the index i, and a second media item, say 214, generally denoted below by the index j, is not explicitly specified, an implicit similarity value can instead be derived by following a directed path such as that represented by edges 210 and 212 from the first media item to an intermediate item, and finally to the second media item of interest, in this example item $m_p$. Any number of intermediate items can be traversed in this manner, which we call a transitive technique. The list of similarity values $M(i, i+1)$, $M(i+1, i+2)$, ..., $M(i+k, j)$ between pairs of media items along this path through the graph are combined in a manner such that the resulting value satisfies a definition of similarity between media item i and media item j appropriate for the application. For example, the similarity $M(i,j)$ might be computed as:

$$M(i,j)=\min\{M(i,i+1),M(i,i+2),\ldots,M(i+k,j)\}$$

or $$M(i,j)=M(i,i+1)*M(i,i+2)*\ldots*M(i+k,j)$$

Other methods for computing a similarity value $M(i,j)$ for the path between a first media item i and a second, non-adjacent media item j where the edges are labeled with the sequence of similarity values $M(i, i+1)$, $M(i+1, i+2)$, ..., $M(i+k, j)$ can be used. From the user standpoint, this corresponds to determining an association metric for a pair of items that do not appear within the same mediaset.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. For example, one of ordinary skill in the art will understand that, while the above system and methods were described as embodied in a media recommendation system, it should be understood that the inventive system could be used in any system for recommending other items that can be grouped by users following some criterion. Although specific terms are employed herein, there are used in a generic and descriptive sense only and not for purposes of limitation.

It will be obvious to those having skill in the art that many changes may be made to the details of the above-described embodiments without departing from the underlying principles of the invention. The scope of the present invention should, therefore, be determined only by the following claims.

We claim:

1. A method comprising:
 storing, in a memory location, a plurality of media sets for a community of users; and
 preprocessing, using a processor, the plurality of media sets to quantify an association between pairs of media items, comprising:
 for each item in a mediaset, identifying every other item in the same mediaset, so as to define all of the pairs of media items in that mediaset;
 repeating said identifying step for every other mediaset in the plurality of media sets, thereby defining every pair of items that appears in any mediaset in the plurality of media sets;
 for each identified pair of media items, adjusting a concurrency metric value responsive to each additional occurrence of the same pair of items in the plurality of media sets;
 storing media library collection data for a plurality of user accounts;
 receiving, from a client device, information about at least one input media item;
 identifying a candidate set of media items by selecting media having an adjusted concurrency value over a predetermined threshold value and containing the at least one input media item;
 accessing the user account associated with the client device; and
 filtering the candidate set based on the media library collection data for the user of the client device.

2. The method of claim 1, wherein the concurrency metric value is a co-concurrency metric value, and adjusting comprises incrementing the co-concurrency metric value responsive to every additional occurrence of the same pair of items in the plurality of media sets.

3. The method of claim 1, wherein:
 the media items are ordered within the mediasets in the plurality of media sets;
 identifying comprises defining ordered pairs of items that appear in any mediaset in the plurality of media sets in the same order;
 the concurrency metric value is an ordered concurrency metric value, and adjusting comprises incrementing the ordered concurrency metric value responsive to every additional occurrence of the same ordered pair of items in the plurality of media sets.

4. The method of claim 1, further comprising:
selecting one or more of the ordered pairs by evaluating the metric value.

5. The method of claim 4, further comprising:
sending a recommendation output set of media items to the client device, the output set comprising media items paired with the at least one input media item.

6. The method of claim 5, further comprising:
receiving, along with the input media item, one or more recommendation preferences from the client device relating to what types of media items a user prefers to receive in the recommendation output set of media items; and
filtering the output set according to the one or more recommendation preferences.

7. The method of claim 5, further comprising:
filtering the output set based on metadata of the at least one input media item.

8. The method of claim 1, further comprising:
sending a recommendation output set of media items to the client device, the output set comprising a filtered candidate set.

9. A system for preprocessing a knowledge base for sending media recommendations comprising:
a database for storing a plurality of media sets for a community of users; and
a processor for preprocessing the plurality of media sets to quantify an association between pairs of media items, wherein the processor is further configured to:
for each item in a mediaset, identify every other item in the same mediaset, so as to define all of the pairs of media items in that mediaset;
repeat said identifying step for every other mediaset in the plurality of media sets, thereby defining every pair of items that appears in any mediaset in the plurality of media sets;
for each identified pair of media items, adjust a concurrency metric value responsive to each additional occurrence of the same pair of items in the plurality of media sets;
store media library collection data for a plurality of user accounts;
receive, from a client device, information about at least one input media item;
identify a candidate set of media items by selecting media having an adjusted concurrency value over a predetermined threshold value and containing the at least one input media item;
access the user account associated with the client device; and
filter the candidate set based on the media library collection data for the user of the client device.

10. The system of claim 9, wherein the concurrency metric value is a co-concurrency metric value, and wherein the processor is further configured increment the co-concurrency metric value responsive to every additional occurrence of the same pair of items in the plurality of media sets.

11. The system of claim 9, wherein the media items are ordered within the mediasets in the plurality of media sets, wherein the processor is configured to define ordered pairs of items that appear in any mediaset in the plurality of media sets in the same order, wherein the concurrency metric value is an ordered concurrency metric value, and wherein the processor is further configured to increment the ordered concurrency metric value responsive to every additional occurrence of the same ordered pair of items in the plurality of media sets.

12. The system of claim 9, wherein the processor is further configured to:
select one or more of the ordered pairs by evaluating the metric value.

13. The system of claim 12, wherein the processor is further configured to:
send a recommendation output set of media items to the client device, the output set comprising media items paired with the at least one input media item.

14. The system of claim 13, wherein the processor is further configured to:
receive, along with the input media item, one or more recommendation preferences from the client device relating to what types of media items a user prefers to receive in the recommendation output set of media items; and
filter the output set according to the one or more recommendation preferences.

15. The system of claim 13, wherein the processor is further configured to:
filter the output set based on metadata of the at least one input media item.

16. A non-transitory computer-readable medium comprising:
a medium configured to store computer-readable instructions thereon; and
the computer-readable instructions that, when executed by a processing device cause the processing device to perform a method, comprising:
storing a plurality of media sets for a community of users; and
preprocessing the plurality of media sets to quantify an association between pairs of media items in the plurality of media sets, comprising:
for each item in a mediaset, identifying every other item in the same mediaset, so as to define all of the pairs of media items in that mediaset;
repeating said identifying step for every other mediaset in the plurality of media sets, thereby defining every pair of items that appears in any mediaset in the plurality of media sets;
for each identified pair of media items, adjusting a concurrency metric value responsive to each additional occurrence of the same pair of items in the plurality of media sets;
storing media library collection data for a plurality of user accounts;
receiving, from a client device, information about at least one input media item;
identifying a candidate set of media items by selecting media having an adjusted concurrency value over a predetermined threshold value and containing the at least one input media item;
accessing the user account associated with the client device; and
filtering the candidate set based on the media library collection data for the user of the client device.

17. The non-transitory computer-readable storage medium of claim 16, wherein the concurrency metric value is a co-concurrency metric value, and adjusting comprises incrementing the co-concurrency metric value responsive to every additional occurrence of the same pair of items in the plurality of media sets.

18. The non-transitory computer-readable storage medium of claim 16, wherein the media items are ordered within the mediasets in the plurality of media sets, the instructions further comprising identifying comprises defining ordered pairs of items that appear in any mediaset in the plurality of media sets in the same order, and wherein the concurrency metric value is an ordered concurrency metric value, and adjusting comprises incrementing the ordered concurrency metric value responsive to every additional occurrence of the same ordered pair of items in the plurality of media sets.

19. The non-transitory computer-readable storage medium of claim 16, the instructions further comprising:
   selecting one or more of the ordered pairs by evaluating the metric value.

20. The non-transitory computer-readable storage medium of claim 16, the instructions further comprising:
   sending a recommendation output set of media items to the client device, the output set comprising media items paired with the at least one input media item.

21. The non-transitory computer-readable storage medium of claim 20, the instructions further comprising:
   receiving, along with the input media item, one or more recommendation preferences from the client device relating to what types of media items a user prefers to receive in the recommendation output set of media items; and
   filtering the output set according to the one or more recommendation preferences.

22. The non-transitory computer-readable storage medium of claim 20, the instructions further comprising:
   filtering the output set based on metadata of the at least one input media item.

23. The non-transitory computer-readable storage medium of claim 20, the instructions further comprising:
   storing media library collection data for a plurality of user accounts in relation to the knowledge base;
   upon receiving the input media item, accessing the user account associated with the client device; and
   filtering the output set based on the user of the client device's media library.

24. A method comprising:
   storing a plurality of mediasets for a community of users;
   defining every pair of media items that appear together in any media set of the plurality of mediasets;
   for each defined pair of media items, assigning a concurrency value to the defined pair, the concurrency value representing the number of times the defined pair appears in a mediaset;
   storing media library collection data for a plurality of user accounts in relation to the plurality of mediasets;
   receiving, from a client device, information about at least one input media item;
   identifying a candidate set of media items by selecting media having the concurrency value over a predetermined threshold value and containing the at least one input media item;
   accessing the user account associated with the client device; and
   filtering the candidate set based on the media library collection data for the user of the client device.

25. The method of claim 24, wherein the concurrency value is a co-concurrency metric value.

26. The method of claim 24, wherein the media items are ordered within the mediasets in the plurality of media sets, further comprising:
   selecting one or more of the ordered pairs by evaluating the metric value.

27. The method of claim 24, further comprising:
   sending a recommendation output set of media items to the client device, the output set comprising media items paired with the at least one input media item.

28. The method of claim 24, further comprising:
   receiving, along with the input media item, one or more recommendation preferences from the client device relating to what types of media items a user prefers to receive in the recommendation output set of media items; and
   filtering the output set according to the one or more recommendation preferences.

29. The method of claim 24, further comprising:
   filtering the output set based on metadata of the at least one input media item.

30. The method of claim 24, further comprising:
   sending a recommendation output set of media items to the client device, the output set comprising a filtered candidate set.

* * * * *